US005555036A

United States Patent [19]
Harnett et al.

[11] Patent Number: 5,555,036
[45] Date of Patent: Sep. 10, 1996

[54] PASSIVE MILLIMETER WAVE TRAFFIC SENSOR

[75] Inventors: Laurence N. Harnett, San Pedro; Mikio L. Yujuri, Torrance; Merit M. Shoucri, Manhattan Beach, all of Calif.

[73] Assignee: TRW Inc., Redondo Beach, Calif.

[21] Appl. No.: 381,361

[22] Filed: Jan. 26, 1995

Related U.S. Application Data

[63] Continuation-in-part of Ser. No. 992,231, Dec. 17, 1992, abandoned.

[51] Int. Cl.$^6$ .................................................. G08G 1/00
[52] U.S. Cl. ................................................ 340/933; 340/936
[58] Field of Search .................... 89/41.03; 455/67.5; 340/933–943

[56] References Cited

U.S. PATENT DOCUMENTS

| H1,011 | 1/1992 | Kline | 102/401 |
|---|---|---|---|
| 4,510,622 | 4/1985 | Mori et al. | |
| 5,229,540 | 6/1993 | Schabdach et al. | 89/41.03 |

OTHER PUBLICATIONS

Meinel, Holger H. "Millimeter–Wave Technology Advances Since 1985 and Future Trends" IEEE Transactions on Microwave Theory and Techniques. Vol. 39, No. 5 May 1991.

*Primary Examiner*—Victor R. Kostak
*Assistant Examiner*—Nathan J. Flynn

[57] ABSTRACT

A passive millimeter traffic sensor sensing device for the direct detection of the movement or presence of vehicles within a predetermined field of view. The sensing device includes MMIC type sensing devices and heterodyne receivers, which include an antenna, local oscillator, mixer, a plurality of intermediate frequency amplifiers, a detector, and appropriate signal conditioning circuitry to detect signals in the millimeter wave region emanating from various objects such as motor vehicles, and also millimeter wave signals from the atmosphere reflected off of such objects. Thus, the sensing device detects the natural millimeter wave radiation coming from a scene. The intensity of the radiation is related to the effective radiometric temperatures in the scene which cause various objects, which have varying characteristics as both millimeter wave emitters and as reflectors, to appear as varying signal amplitudes to the sensing device. The sensing device may be mounted at a highway overpass or atop a light pole adjacent a highway and can provide information relating to the presence of a vehicle, whether moving or stationary, as well as the approximate length of the vehicle and approximate speed at which the vehicle travels through the sensing device's predetermined field of view.

21 Claims, 3 Drawing Sheets

→ COLD SKY REFLECTS OFF OF CAR
→ WARM ROAD EMITS

PASSIVE MILLIMETER WAVE TRAFFIC SENSOR

This application is a Continuation-in-Part of application Ser. No. 07/992,231, filed Dec. 17, 1992, now abandoned.

BACKGROUND OF THE INVENTION

1. Technical Field

This invention relates generally to detecting systems, and more particularly to a passive millimeter wave detector particularly well adapted for detecting the presence of moving or stationary vehicles for the purpose of controlling and monitoring traffic generally, as it moves over highways, airport runways, railroad-right-of-ways and sea lanes, or generally along any defined path taken by a vehicle under normal conditions of visibility as well as conditions of poor visibility.

2. Discussion

The ability to monitor traffic is becoming increasingly important as highways, expressways and airport runways become increasingly more heavily traveled and congested. While the following discussion will refer to highway conditions, it will be understood the invention can be useful anywhere vehicles move along fixed and predetermined routes.

Most prior known systems use magnetic induction loops buried just beneath the roadway surfaces and respond to passing vehicles by sensing a change in the resonant frequency in the circuit containing the loop. Such systems are expensive and inconvenient to install and maintain. Furthermore, such systems may be impossible to implement in certain applications, such as in connection with monitoring sea traffic lanes. Accordingly, there is a need for new detection and monitoring systems that are easy and inexpensive to install, maintain and operate without disturbing the roadway and delaying traffic in the process.

One form of system currently being produced which does not require a sensor buried in the roadway uses a Doppler radar that directly measures the vehicle velocity as a frequency shift using the outgoing RF radiation and the reflected signal. These systems suffer from the deficiency of being unable to detect stopped vehicles which produce no frequency shift in the reflected signal. These systems typically rely on irradiating an area with RF radiation which may interfere with other radar or communications equipment.

Ultrasonic waves and reflected light have been used as sensors in place of RF radiation but are known to have reduced operating capability in bad weather.

Wide area detection techniques using video cameras have been established. While these systems can monitor multiple lanes of traffic over extended distances using a single camera, the images must be computer-processed to extract the desired data. Image processing is complex and subject to errors due to the cluttered scenes (e.g., car headlights at night versus sunlight during the day, highlights due to direct reflection of sunlight from shiny surfaces, shadows due to passing clouds, etc.). Furthermore these systems perform poorly under conditions where there is low visibility due to fog or blowing dust.

While the above approaches have met with some success, each nevertheless is subject to the drawbacks of high life-cycle costs, inability to sense stationary vehicles, inability to function in bad weather conditions, emission of undesirable RF radiation, or the introduction of significant errors due to complex data interpretation.

Applicants have invented a sensing device for the passive detection of the naturally occurring millimeter wave ("MMW") radiation which forms part of the electromagnetic spectrum, from about 30 to 300 GHz (wavelengths of 1 to 10 millimeters). This approach overcomes all of the aforementioned limitations to provide comprehensive traffic monitoring data including vehicle count, stopped vehicles, and the vehicle's speed and length.

The phenomenon of passive millimeter wave detection is a function of the radiation wavelength. At micro and millimeter wavelengths that correspond to windows of high atmospheric transparency (e.g., 10 GHz, 35 GHz, 95 GHz, and 140 GHz), the sky appears very cold (tens of degree Kelvin) regardless of whether it is day or night. This long wavelength radiation is only slightly attenuated by atmospheric fog or cloud droplets and hence the apparent sky temperature is insensitive to weather conditions. Objects that are observed at MMW wavelengths are characterized as having a "radiometric temperature" which is the equivalent of the black body temperature required to produce an equivalent radiated power. Metallic objects are highly reflective and virtually non-emissive at these wavelengths and therefore radiate very low levels of radiation, independent of weather or time of day. Such objects assume the radiometric temperature of whatever they reflect. Rough nonmetallic solids, on the other hand, are highly emissive and emit higher radiated power, and are characterized by a radiometric temperature nearly equal to its physical temperature. Water is intermediate in reflectivity and its radiometric temperature represents a mix of reflected and emitted radiation.

With particular regard to a traffic sensing system, it will now be appreciated that the difference in effective radiometric temperatures and radiated power per unit area between a vehicle and the surface upon which it is traveling, such as asphalt, forms the basis for the passive millimeter wave traffic sensor. For example, asphalt will radiate a higher power per unit area and will appear to be at a higher radiometric temperature. A metallic vehicle, however, radiates a lower power per unit area and it will appear to be at a lower radiometric temperature. A sensor which can measure the amount of radiated power coming from a specific area on the road surface will detect the passage of the vehicle as a change in the amount of power received. The effect is insensitive to daylight, night, clouds, fog or precipitation. If the vehicle is stopped, the decrease in the received signal persists as long as the vehicle is present, so that detection of the vehicle presence does not depend on vehicle motion. By sensing the rate of change of the received power as the vehicle enters and leaves the field of view of the sensor, the speed of the vehicle can be estimated. By measuring the duration of the period during which the vehicle signature is present, and from the previously known vehicle speed, the length of the vehicle can also be estimated.

It is therefore a principal object of the present invention to provide a passive millimeter wave sensor capable of detecting objects such as land, sea and air vehicles within a predetermined field of view.

It is another object of the present invention to provide a passive millimeter wave sensing device to detect the presence of millimeter wave signals emanating from a predetermined field of view, such as a lane of a highway, airport runway or sea lane.

It is yet another object of the present invention to provide a passive millimeter wave sensing device which can detect millimeter wave signals within a predetermined field of view and can operate under a wide range of weather conditions in a wide range of geographical locations and seasons of the year.

It is still another object of the present invention to provide a passive millimeter wave sensing device for detecting millimeter wave signals within a predetermined field of view for the millimeter wave radiation which may be mounted above ground at locations proximate to where the subjects are to be monitored, and which can provide information relating to the speed and length of moving objects, as well as the presence or absence of objects, whether stationary or moving, as well as a total count of the objects (i.e., vehicles) which pass through the field of view of the sensing device.

SUMMARY OF THE INVENTION

The above and other objects are accomplished by a passive millimeter wave traffic sensor sensing device in accordance with the preferred embodiments of the present invention. A preferred embodiment of the invention generally comprises a heterodyne receiver which includes: antenna means for receiving millimeter wave (MMW) signals; means for generating an intermediate frequency analog signal from the received MMW signals; means for amplifying a portion of the intermediate frequency analog signal; means for converting the amplified intermediate frequency signal to a low frequency analog signal; means for converting the low frequency signal to a corresponding digital signal. Processing means is provided for processing the converted low frequency digitized signal along different processing paths to processor means for differentiating the conditions existing in the field of view during the period of time.

Another preferred embodiment of the sensing device generally includes means forming a focusing lens (deemed a form of antenna for the purpose of this invention) for receiving millimeter wave signals emanating from a field of view. The received millimeter wave signals emanating from the predetermined field of view are received by a mixer means which is also responsive to an oscillator means for generating a predetermined, oscillating reference frequency. The mixer means generates an intermediate frequency output signal ("IF") which is transmitted to an IF amplifier means. The amplifier means functions as a filter and amplifies only a portion of the received IF signal.

As part of the heterodyne receiver there is provided a detector means which receives an output from the amplifier means and detects the presence of the millimeter wave signals received by the antenna means. The detector means provides an output signal to the signal conditioning means, which in turn provides an output to a suitable processing system for collecting data from the sensing device regarding the detected scene. The preferred embodiment of the sensing device further includes a housing for enclosing the various components of the sensing device. The housing is further preferably weatherproofed so as not to be affected by rain, sleet, snow or other elements associated with inclement weather.

The sensing device further includes an optional removable sighting scope means, which is not part of the invention, but which enables the focusing lens means to be aimed more accurately at a desired field of view during setup or installation procedures.

Another preferred embodiment comprises a microwave/millimeter wave monolithic integrated circuit ("MMIC") using GaAs which functions as a low noise receiver. The MMIC chip includes a multiple stage millimeter wave low noise amplifier that supplies a detector diode. Direct amplification of the millimeter wave signal obviates the need for a mixer and local oscillator. The MMIC chip is simpler to use, consumes less power than a heterodyne receiver and is lower in cost to fabricate.

Preferably, the preferred embodiments of the present invention are mounted so that they optimally "see" the subjects in the field of view to receive the radiation and reflection from the radiometrically hot and cold subjects. In traffic monitoring systems, a preferred location for the sensing device may be at an overpass of a highway or along the roadside mounted on a pole support. It will be appreciated that an appropriate location is one that will provide the optimum radiometric contrast between MMW radiation from the roadway and from passing vehicles. The sensing device has an operable monitoring range for observing oncoming vehicles as much as 100 meters away. The preferred monitoring range is within 50 meters of the sensing device.

As discussed earlier the sensing device readily lends itself to monitoring vehicular movement along well defined pathways, such as roadways and runways at airports where landed taxing aircraft need to be controlled during many different conditions that occur at airports such as rain, fog, snow, dust, and even darkness.

A principal advantage of the preferred embodiments is the ability to detect MMW signals and to provide output signals from which the total number of vehicles passing through the field of view can be determined, the approximate length of a vehicle, the approximate speed at which the vehicle travels through the field of view, and the approximate time during which the vehicle is within the field of view.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENT

Figure 1:
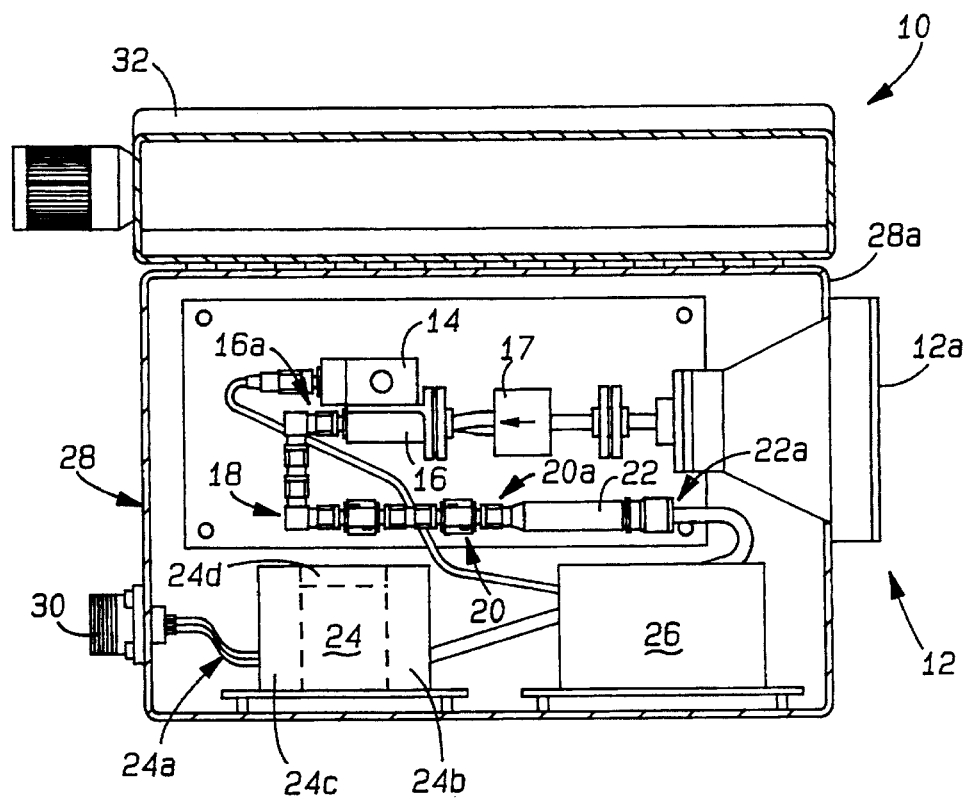
FIG. 1 is a partial cross sectional view of a passive millimeter wave traffic sensor sensing device in accordance with a preferred embodiment of the present invention.
Figures 2, 3:
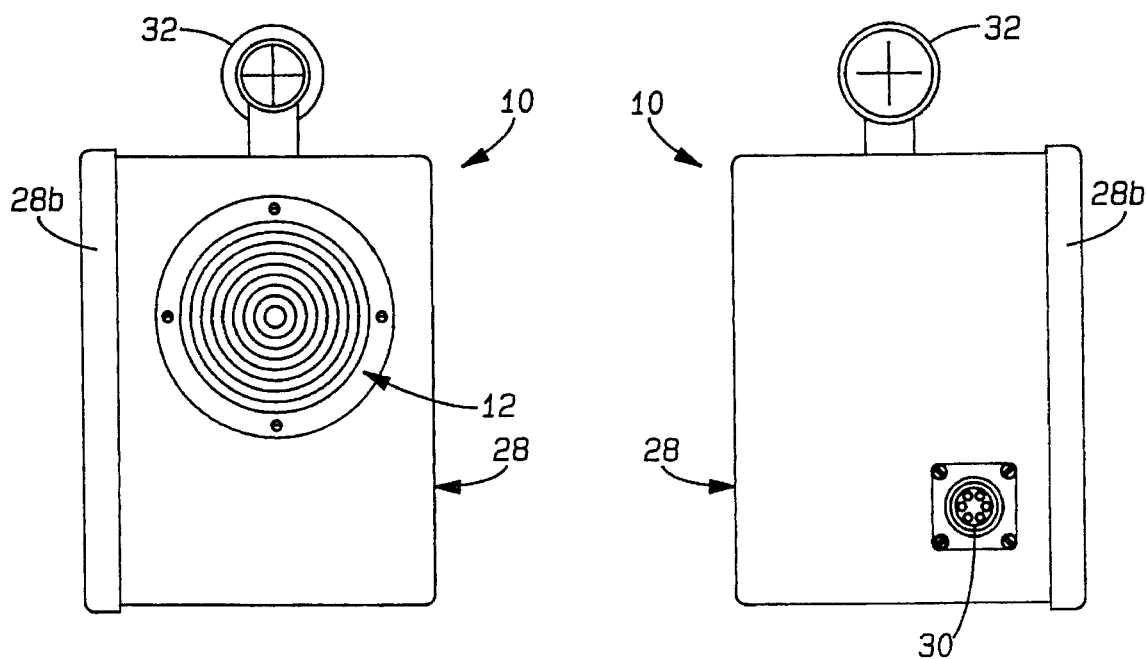
FIG. 2 is a front elevation view of the sensing device of FIG. 1.
FIG. 3 is a rear elevation view of the sensing device of FIG. 1.

Referring to FIGS. 1 through 3, there is shown a passive millimeter wave sensing device 10 in accordance with one of the preferred embodiments of the present invention. With reference specifically to FIG. 1, the sensing device generally comprises a focusing lens/horn 12 having a transmissive optic 12a, a local oscillator 14, a mixer 16, a first intermediate frequency amplifier 18, a second intermediate frequency amplifier 20, a video detector 22 and signal conditioning circuitry 24. A power supply 26 is included for supplying power to the various components mentioned herein before. Also, an optional isolator 17 may be intercoupled in between the focusing lens/horn 12 and the mixer 16 to permit millimeter wave radiation to enter the mixer 16 while preventing the emission of any such radiation.

All of the above-mentioned components are further housed within a preferably water-tight housing 28. A data cable (not shown) is connected to the sensing device 10 through a connector 30 so that the information sensed by the sensor device 10 relating to detected vehicle movement is interpreted and output as data representative of what is taking place in the field of view as more fully described hereinafter. The signal conditioning circuitry 24 is connected to the connector 30 via a suitable electrical bus 24a. The signal conditioning circuitry 24, in turn, is coupled to an output 22a of the detector 22. The detector 22, similarly, receives millimeter wave signals after they have been filtered by the IF amplifiers 18 and 20, which also provide an output signal at 22a.

The first IF amplifier 18 receives an output signal 16a after the millimeter wave signal received through the focusing lens/horn 12 has been mixed with the signal of the local oscillator 14. It will be appreciated that a wide range of frequencies of the millimeter wave signals can be detected. The generally preferred frequency is in the range of about 35 GHz to 94 GHz. It will be appreciated that the higher frequency of 94 GHz permits the use of smaller sensors, however, lower frequencies can be used depending on sensor availability.

The signal conditioning circuitry 24 includes an analog processing circuit 24b, an analog-to-digital converter 24c, as well as a suitable controller 24d, such as a digital microprocessor, for analyzing the output signal generated by the sensing device. Accordingly, the signal conditioning circuitry 24 receives the signal output at 22a of the video detector 22, which is in the form of a time varying analog signal, from which is amplified and/or filtered by the analog signal processing circuit 24b. The processed analog signal is digitized by the analog-to-digital converter 24c, from which is generated a corresponding digital signal in the form of a serial bit stream. The serial bit stream may be stored and analyzed by the microprocessor 24d and the results stored in a suitable memory of the circuit 24 or, sent to an external data collecting device such as a computer. The power supply (26) may be of any conventional design suitable for providing about 10 watts of power from either an AC or DC current source.

The lens 12a of the focusing lens/horn 12 is formed of a suitable plastic material such as Teflon® or Rexolite®. For a lens aperture of about 7.5 cm in diameter, the sensor observes a "spot-size" or field of view, of about 2 meters in diameter at a distance of about 50 feet (about 15 meters). For distances less than 50 feet this field of view decreases linearly.

Figure 4:
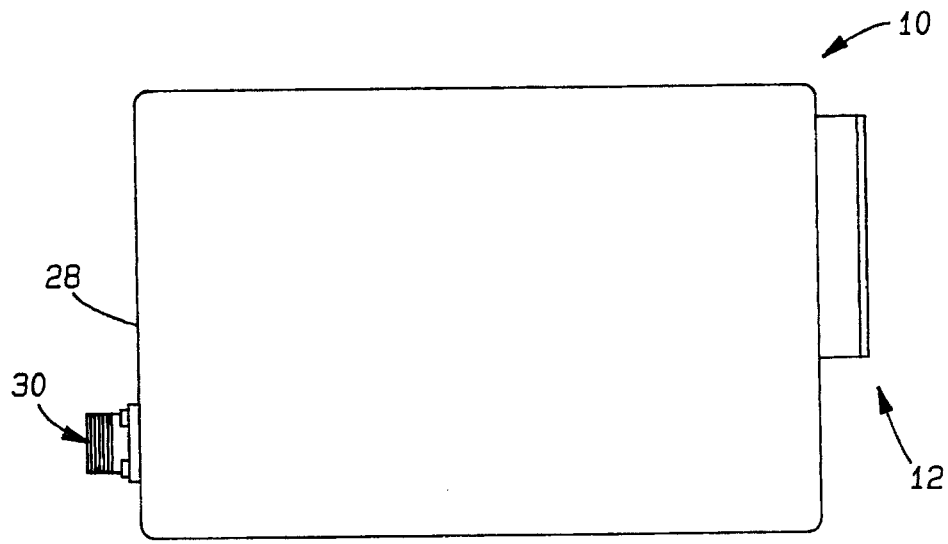
FIG. 4 is a side elevation view of the sensing device of FIGS. 1 through 3 showing the sensing device without its optional sighting scope attached thereto.

In FIGS. 2–4, it can be seen that the housing includes a removable wall portion 28b. The wall portion 28b enables access to the components of the sensing device 10 while protecting same from rain or snow, or other elements.

In another preferred embodiment the functions performed by the components described in connection with sensing device 10 are performed by a MMIC chip. The MMIC technology enables the fabrication of low noise amplifiers (LNA) that can operate directly at the MMW frequencies received by the sensing device. A MMIC based LNA is placed in a waveguide component that can be attached directly to the back end of the lens/horn 12. MMW radiation by the lens/horn is directed into the LNA for amplification. The amplified MMW signal is then fed to a detector which is part of the chip and which performs the same function as element 22 in FIG. 1. The output is an analog signal which is further processed by the signal conditioning circuitry 24.

Understandably, successful operation of the sensing device depends on the level of intensity of the MMW radiation. The intensity is primarily related to the effective radiometric temperatures emanating from the field of view. The sensing device 10 detects various subjects in the field of view and generates a signal representative of the radiometric temperatures. Objects that have high radiometric temperature are "hot" and generate large amplitude signals, while objects that are "cold" have low radiometric temperature and generate signals of lower amplitude. It will be appreciated that the radiometric temperature is influenced by reflections from the surface of the objects and may not be the same as the thermodynamic temperature.

Figure 5:
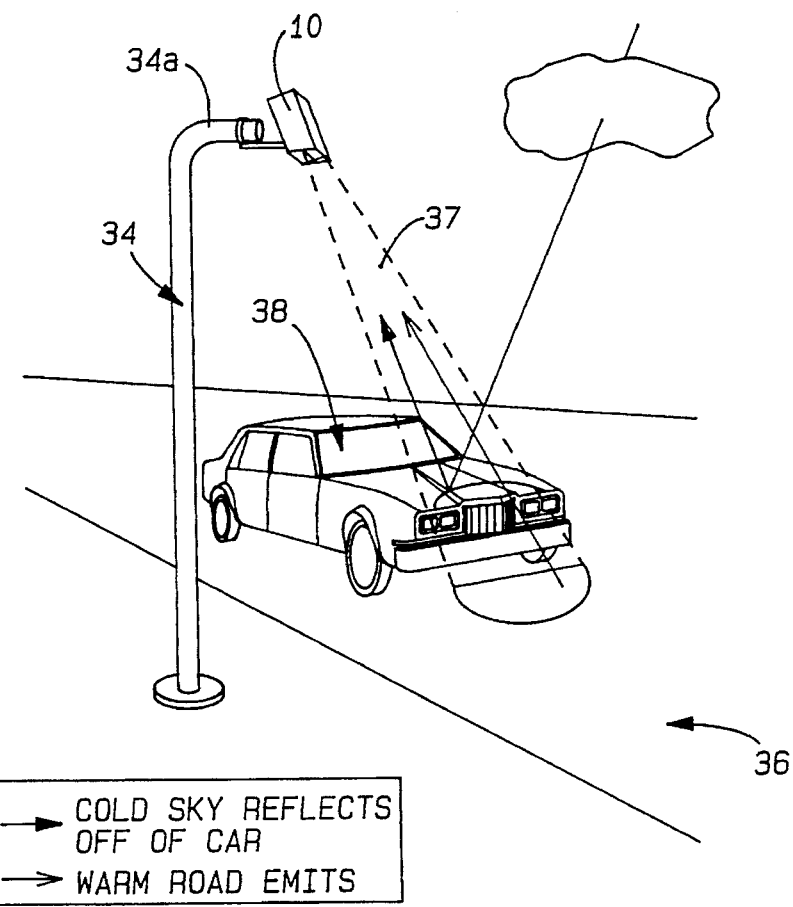
FIG. 5 is a diagrammatic view of the sensing device of the present invention mounted atop a suitable support adjacent a highway.

Referring now to FIG. 5 there is illustrated one manner of using the sensing device 10 as a highway traffic controller. The sensing device 10 is shown mounted at the upper end 34a of a lightpole positioned adjacent an asphalt covered highway 36 establishing a field of view 37. The asphalt highway 36 is at a relatively high radiometric temperature. The field of view 37, without the presence of a vehicle, generates a large signal because the asphalt, although it is a poor reflector of MMW radiation, is a good emitter of such radiation. In this condition the field of view overall generates a higher power signal.

As the vehicle 38 moves into the field of view, the emission of MMW radiation from the asphalt surface is interrupted, while the vehicle 38 itself transfers less power from the field of view in the MMW bands. In other words, the large radiometric signal from the asphalt is mixed and even replaced with a low signal from the vehicle. The metallic surfaces of the vehicle 38, being poor emitters, now reflect the "cold" sky, thereby transferring little power per unit area in the millimeter wave bands, while simultaneously blocking the emission of millimeter wave radiation from the road 36. As the vehicle moves through the field of view the signal detected by the sensing device 10 decreases in magnitude and reaches a minimum value when it dominates the field.

Upon departing the field of view the signal again begins to increase in magnitude as once again the asphalt MMW emissions reach the sensing device and will reach its original large value when the vehicle 38 has cleared the field of view.

In the circumstance an array of sensing devices is employed across a span of highway there may be some crosstalk between devices which is readily avoided by directing the field of view of each sensor in the array so there is no overlap. The angle at which the sensing device 10 is mounted relative to nadir will affect the contrast between hot and cold subjects. As an example, it has been found that for many installations pointing the sensor at any angle between about 0 to 45 degrees from nadir will give useful contrasts between the vehicle and the roadway.

Figure 6:
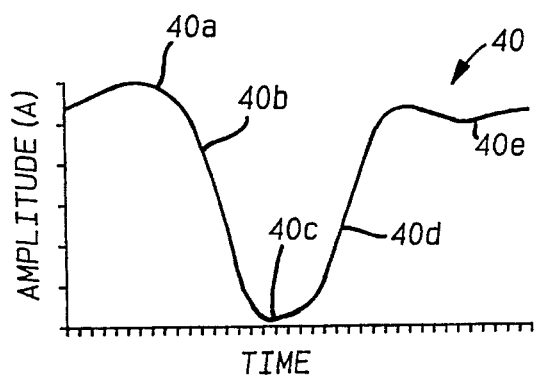
FIG. 6 is a plot of the amplitude of the millimeter wave signal received by the sensing device in FIG. 5 as a vehicle passes through the predetermined field of view of the sensing device.

With specific reference to FIG. 6, a plot of the amplitude (i.e., power) of the millimeter wave signal detected by the sensing device 10 in FIG. 5 is shown as the vehicle 38 passes into and through the predetermined field of view of the sensing device 10. Initially, the sensing device 10 detects a millimeter wave signal of a generally maximum value, as indicated by portion 40a of waveform 40. At this point the vehicle 38 has not yet entered the predetermined field of view of the sensing device 10. Accordingly, the sensing device 10 is receiving the full strength of the natural millimeter wave emissions from the asphalt covered highway 36. Reflections of the millimeter wave emissions of the atmosphere off of the asphalt covered highway 36 are negligible since the asphalt is a poor reflector.

As the vehicle 38 enters the predetermined field of view of the sensing device 10, the amplitude of the detected millimeter wave signal drops sharply, as indicated by portion 40b of waveform 40. This is because the vehicle 38 is obstructing a progressively larger area of the asphalt covered highway 36 as it moves rapidly within the complete field of view of the sensing device 10. Since the metal of the vehicle 38 is a poor emitter, and further tends to reflect the "cold" sky, the power per unit area of the detected millimeter wave signal drops sharply.

When the vehicle 38 completely fills the predetermined field of view of the sensing device 10, the amplitude of the detected millimeter wave signal is at its minimum, as indicated by portion 40c of the waveform 40. As the vehicle begins to move out of the field of view of the sensing device 10, the amplitude of the detected signal increases sharply, as indicated by portion 40d of waveform 40.

As the vehicle 38 moves completely out of the predetermined field of view of the sensing device 10, the asphalt covered highway 36 will completely fill the predetermined field of view. The sensing device 10 then receives the higher power per unit area millimeter wave signal of the asphalt covered highway 36, as indicated by portion 40e of waveform 40. Thus, it will be appreciated that the sensing device 10 cannot only sense the presence of a moving vehicle which comes within its predetermined field of view, but also can provide information from which the length of time which the vehicle remains within its field of view can be determined. Furthermore, the vehicle 38 will be detected whether it is moving or stationary as long as it is at least partially within the field of view of the sensing device 10.

From the above, it will also be appreciated that the approximate length of the vehicle 38 can be determined, as well as the approximate velocity at which the vehicle 38 passes through the field of view of the sensing device 10. With specific reference to FIG. 7, a plot of the rate of change of the amplitude signal of FIG. 6 versus time is shown. As the vehicle 38 moves within the predetermined field of view of the sensing device 10, the rate of change of the signal drops as the vehicle 38 begins to fill the field of view, as indicated by portion 42a of waveform 42. The rate of change of the amplitude of the detected millimeter wave signal versus time reaches a maximum swing at point 42b corresponding to the maximum rate at which the field of view is being filled. The point at 42c corresponds to a no change condition in amplitude when the field of view is totally filled. Similar to the condition that gave rise to the results in point 42b, point 42d corresponds to the maximum rate at which the vehicle 38 leaves the field of view. From the rate of change of the amplitude versus time, as indicated by portions 42b and 42d of the waveform 42, the vehicle speed can be readily mathematically determined. Also, the approximate length of the vehicle can be determined by multiplying the vehicle speed by the value of the "dwell" time as represented by time period 42e. Time period 42e is a measurement of the time it takes from when the front portion is sensed at approximately the halfway point into the field of view to when the very end of the vehicle leaves the halfway point.

Figure 7:
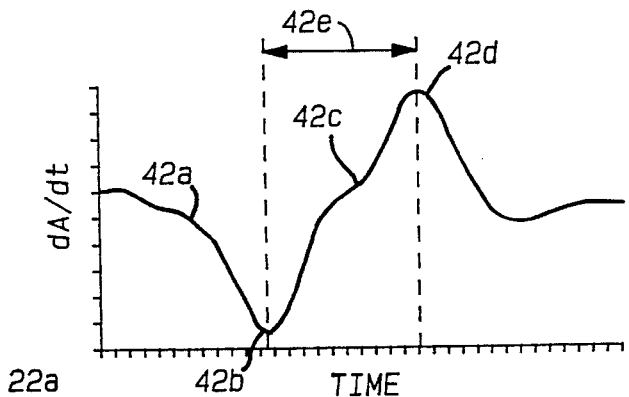
FIG. 7 is a plot of the rate of change of the amplitude of FIG. 6 with respect to time, showing more particularly how the rate of change of the amplitude of the received millimeter wave signal leads to the determination of the vehicle length and speed.

From the described interpretation of the data that resulted in the plots of FIGS. 6 and 7, it will be appreciated that other useful parameters relating to a passing vehicle may be easily obtained. For example, every occurrence of a vehicle signature pulse, such as represented by waveform 40, can be associated with a passing vehicle. Accordingly, a vehicle "count" can be obtained for the total number of vehicles passing through the predetermined field of view of the sensing device 10 within a given time. If a particular pulse (i.e., waveform 40) remains low at 40c, for example, then it can also be concluded that a particular vehicle has stopped within the field of view of the sensing device 10. If no pulse occurs, then it can be concluded that there is no traffic on the asphalt covered highway 36.

Figure 8:
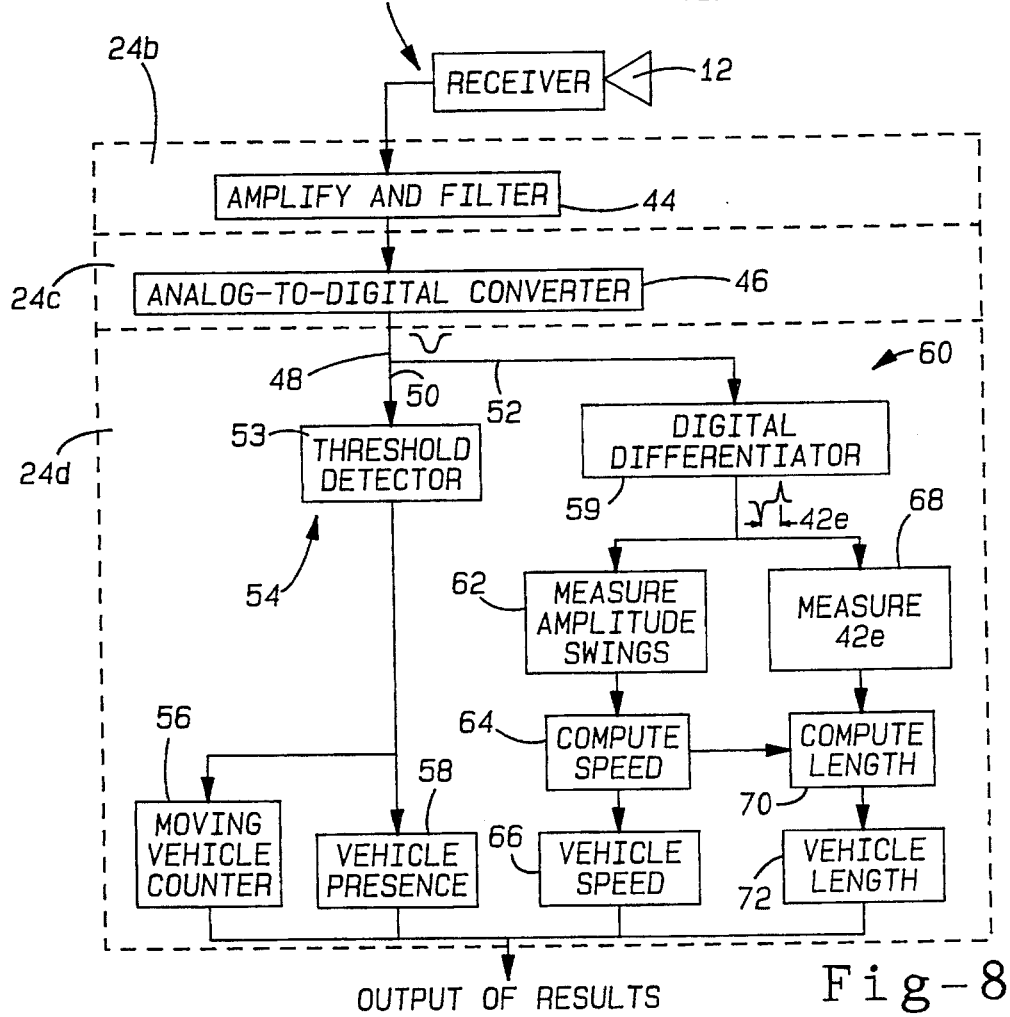
FIG. 8 is flow diagram of the processing steps which the received signal undergoes in the sensing device including the microprocessor to produce the output signal.

The signal conditioning circuitry 24 is used to obtain the useful parameters described above, such as vehicle count, presence, speed, and length. FIG. 8 diagrams in more detail the contents of the signal conditioning circuitry, including the analog signal processing circuitry 24b, the analog-to-digital converter 24c, and the microprocessor used for control and signal analysis 24d, and the steps of operation of the signal conditioning circuitry 24.

In FIG. 8, the lens/horn 12 collects and passes the MMW radiation to the receiver (heterodyne or MMIC), resulting in the analog signal 22a. This analog signal is amplified and filtered in the analog signal processing circuit 24b, as indicated at 44. The resulting processed analog signal is then digitized by the analog-to-digital converter 24c, as indicated at 46. The digital representation of the signal is then passed to the microprocessor 24d, as shown at 48, and is similar in appearance to FIG. 6.

The microprocessor 24d, through appropriate programming, performs analysis on the digitized signal data. In particular, the signal is split into two analysis paths 50 and 52. The first path 50 leads to a threshold detector 53 which determines if the signal represents 1) a moving vehicle, 2) a stopped vehicle, or 3) no vehicular traffic, as indicated at 54. If a moving vehicle caused the threshold detector 53 to respond, then a register containing the vehicle count is updated, as indicated at 56. Conversely, if no vehicular traffic is detected, then no update occurs. However, if a stopped vehicle causes the threshold change then data indicating a vehicle presence is set, as indicated at 58.

The second analysis path leads to a digital differentiator 59 which creates a digitized representation similar to FIG. 7, as indicated at 60. This differentiated signal is analyzed in two ways. The first measures the amplitude swings, as shown at 62, to allow the computation of the vehicle speed, as indicated at 64 and 66. The second path measures the time separation between the maximum amplitude peaks (represented by 42e), as indicated at 68. This is used, in conjunction with the vehicle speed, to determine the vehicle length, as shown at 70 and 72. The four parameters of vehicle count, presence, speed, and length, are stored and/or passed on to an external data logger.

In any form of application of the sensing device 10, it will be appreciated that since the sensing device 10 detects changes in the millimeter wave signals emitted from a roadway surface, in addition to millimeter wave signals reflected from metal surfaces of moving or stationary vehicles, that the "line of sight" of the sensing device 10 between the predetermined area comprising the predetermined field of view not be obstructed by objects such as trees, billboards, or other objects which would impede the detection of directly emitted or reflected signals. However, rain, snow or even heavy cloud layers, while degrading the directly emitted and reflected millimeter wave signals emitted from the sky, still will not completely impede the detection of such signals by the sensing device 10. The significant contrast between a metal vehicle and the roadway will be sufficient for the sensing device 10 to detect the signal, whether the roadway is asphalt or concrete.

Furthermore, while the examples provided herein have been with an asphalt covered road, it will be appreciated that concrete will have its own detectable emissions. Thus, the sensing device 10 may be implemented in applications where a vehicle must be detected traveling over a concrete highway.

It will be appreciated, then, that the sensing device 10 of the present invention could be easily employed in a number of wide ranging and diverse applications where detection of various objects, whether moving or stationary, is desired. Those skilled in the art can now appreciate from the foregoing description that the broad teachings of the present invention can be implemented in a variety of forms. Therefore, while this invention has been described in connection with particular examples thereof, the true scope of the invention will not be so limited since other modifications will become apparent to the skilled practitioner upon a study of the drawings, specification and following claims.

What is claimed is:

1. A sensing device for the passive sensing of millimeter wave ("MMW") signals emanating from a predetermined field of view for determining therefrom information relating to the presence and absence of moving vehicles and a velocity and a length of each said vehicle within said predetermined field of view, said sensing device comprising:

antenna means for receiving said MMW signals;

low noise amplifier means for amplifying a portion of said MMW signal;

detector means for generating a time varying analog signal from said amplified portion of said amplified MMW signal;

analog signal processing means for processing said time varying analog signal;

analog-to-digital converter means for converting said time varying analog signal to a digital signal; and digital signal processing means for processing said digitized signal along a plurality of processing paths to determine information relating to said presence and absence of said moving vehicles and said velocity and said length of each said vehicle within said predetermined field of view.

2. The sensing device of claim 1, wherein said device is a heterodyne receiver which includes:

mixer means responsive to said antenna means for generating an intermediate frequency analog signal from said MMW signals received by said antenna means;

oscillator means for generating an oscillating signal having a fixed MMW frequency; and analog signal processing means for amplifying and filtering said time varying analogy means.

3. A passive millimeter wave sensing apparatus for sensing the presence and absence of moving or stationary vehicles in a predetermined field of view and a velocity and a length of each said vehicle, said sensing device comprising:

antenna means for receiving a millimeter wave signal from the atmosphere reflected by a surface of said vehicle and a millimeter wave signal emitted from a surface upon which said vehicle is traveling on within a predetermined field of view;

oscillator means for generating an oscillating signal having a frequency within a range of about 35 GHz to 94 GHz, inclusive;

mixer means responsive to said oscillator means and said detected millimeter wave signals for mixing said oscillating signal and said detected millimeter wave signals and generating an intermediate frequency output signal;

amplifier means responsive to said intermediate frequency output signal of said mixer means for amplifying said signal;

detector means for detecting at least a portion of said millimeter wave signal and generating a time varying analog signal in accordance therewith;

analog signal processing means for processing said time varying analog signal;

analog-to-digital converter means for converting said time varying analog signal to a digital signal;

digital signal processing means for processing said digital signal along independent first and second processing paths;

threshold detector means disposed in said first processing path and being responsive to said digital signal, said digital signal being indicative of the presence and absence of moving and stationary vehicles for detecting a threshold response; and digital differentiator means disposed in said second processing path and being responsive to said digital signal for generating a differentiated digital signal from said digital signal, said differentiated digital signal being indicative of the velocity and the length of each said vehicle within said predetermined field of view.

4. The sensing device of claim 3, further comprising isolator means disposed intermediate said antenna means and said mixer means for permitting millimeter wave radiation to enter said mixer means while preventing said millimeter wave radiation from exiting said mixer means.

5. The sensing device of claim 3, wherein said antenna means, said oscillator means, said mixer means, said amplifier, said detector means, said analog signal processing means, said analog-to-digital converter means, and said digital signal processing means are enclosed within a housing.

6. The sensing device of claim 5, wherein said sensing device further comprises removable scope means for enabling visual aiming of said antenna means by an individual in accordance with said predetermined field of view.

7. The sensing device of claim 6, wherein said removable scope means comprises a removable sighting scope fixedly secured to an upper surface of said housing.

8. The sensing device of claim 3, wherein said amplifier means comprises a first intermediate frequency amplifier and a second intermediate frequency amplifier, said first and second intermediate frequency amplifiers being operable to provide a bandwidth from approximately one to two GHz.

9. The sensing device of claim 3, further comprising power supply means for supplying power to at least said oscillator means, said mixer means, said amplifier means, said detector means, said analog signal processing means, said analog-to-digital converter means, and said digital signal processing means of said sensing device.

10. The sensing device of claim 3, wherein said signal processing means includes an analog signal processor to amplify and filter the time varying analog signal, an analog-to-digital converter for generating a digital signal in accordance with said time varying analog signal output from said analog signal processing means, said detector means, and said digital signal processing means.

11. A passive millimeter wave sensor sensing device for detecting moving objects within a predetermined field of view, said sensing device comprising:

an antenna for receiving millimeter wave signals and restricting a reception of said received millimeter wave signals to millimeter wave signals emanating from within said predetermined field of view;

oscillator means for generating an oscillating reference signal in the range of about 35 to 94 GHz, inclusive;

mixer means responsive to said oscillator means and said antenna for receiving said millimeter wave signal and said oscillating reference signal and generating a first output signal therefrom;

intermediate frequency amplifier means responsive to said mixer means for receiving and amplifying said first output signal and generating a second output signal therefrom having a predetermined bandwidth from about 1 GHz to 2 GHz, inclusive;

detector means responsive to said second output signal from said intermediate frequency amplifier means for detecting the presence of said received millimeter wave signals and generating a third output signal, said third output signal being a time varying analog signal;

analog signal processing means for processing said time varying analog signal;

analog-to-digital converter means for converting said third output analog signal at said detector means to a digital signal in the form of a digital serial bit stream;

digital signal processing means for processing said digital serial bit stream along independent first and second digital processing paths;

threshold detector means disposed in said first digital processing path and being responsive to said digital serial bit stream, with a first digital signal being indicative of absence of said object and a second digital signal being indicative of said presence of said object; and digital differentiator means disposed in said second digital processing path and being responsive to said digital bit stream for generating a differentiated digital serial bit stream from said digital serial bit stream, with said differentiated digital serial bit stream amplitude swings being indicative of said velocity of said object, and a time separation between maximum amplitude peaks of said differentiated digital bit stream being indicative of a length of said object.

12. The sensing device of claim 11, further comprising isolator means interposed between said antenna and said mixer means for permitting said received millimeter wave signals to be transmitted to said mixer means while prohibiting a transmission of millimeter wave signals from said mixer means.

13. The sensing device of claim 11, further comprising a power supply for supplying power to said oscillator means, said mixer means, said intermediate frequency amplifier means, said detector means and said signal conditioning means.

14. The sensing device of claim 11, further comprising a weatherproof housing for housing said antenna means, said oscillator means, said mixer means, said intermediate frequency amplifier means, said detector means and said signal conditioning means therein.

15. The sensing device of claim 14, further comprising a removable sighting scope affixed to an upper surface of said weatherproof housing for enabling said antenna to be aimed at an area in accordance with said predetermined field of view.

16. The sensing device of claim 11, wherein said detector means detects millimeter wave signals having a frequency in the range of about 35 to 94 GHz inclusive.

17. A method for detecting the presence and absence of stationary objects and a velocity and a length of moving objects within a desired field of view, said method comprising the steps of:

defining said desired field of view;

passively receiving millimeter wave signals emanating from said desired field of view;

filtering said received millimeter wave signals to remove signals outside of a range encompassing received signals having frequencies between about 35 GHz to 94 GHz, inclusive;

detecting the presence of millimeter wave signals falling within said range of frequencies;

defining a first processing path for detecting said presence and absence of said objects in response to said millimeter wave signals received within said frequency range between about 35 GHz to 94 GHz, inclusive, within said field of view; and defining a second processing path for detecting said velocity and length of each one of said moving objects in response to said millimeter wave signals received within said frequency range between about 35 GHz to 94 GHz, inclusive, within said desired field of view.

18. The method of claim 17, further comprising the step of positioning an antenna for receiving said millimeter wave signals emanating from within said desired field of view by the use of a removable sighting scope disposed closely adjacent said antenna.

19. A method for detecting moving and stationary vehicles within a desired field of view, said method comprising the steps of:

using an antenna to receive millimeter wave signals emanating from an area in accordance with a desired field of view;

filtering said received millimeter wave signals to remove signals outside of range encompassing received signals having frequencies between about 35 GHz to 94 GHz, inclusive;

using a millimeter wave detector to detect millimeter wave signals having frequencies in accordance with said frequency range from said received millimeter wave signals;

causing said millimeter wave detector to generate a time varying analog signal in accordance with said detected millimeter wave signals;

using signal conditioning means to convert said time varying analog signal to a digital serial bit stream;

defining a first processing path being responsive to said digital serial bit stream, with a first digital signal of said serial bit stream being indicative of said absence of said vehicle when said received millimeter wave signal is higher than predetermined threshold and a second digital signal of said serial bit stream being indicative of said presence of said vehicle when said received millimeter wave signal is lower than said predetermined threshold; and defining a second processing path being responsive to said digital serial bit stream for generating a differentiated digital serial bit stream from said digital serial bit stream, with said differentiated digital serial bit stream having amplitude swings being indicative of said velocity of said vehicle and a time separation between maximum amplitude peaks of said differentiated digital bit stream being indicative of a length of said vehicle.

20. The method of claim 19, further comprising the use of a removable sighting scope positioned closely adjacent said antenna for enabling an individual to manually position said antenna so as to be aligned with said desired field of view.

21. The method of claim 19, further comprising the step of placing said antenna closely adjacent to a highway, atop a light pole.

* * * * *